US008455561B2

(12) United States Patent
Peschko et al.

(10) Patent No.: US 8,455,561 B2
(45) Date of Patent: Jun. 4, 2013

(54) METHOD FOR THE PRODUCTION OF FOAMS ON SILICONE BASIS

(75) Inventors: Christian Peschko, Burghausen (DE); Johann Mueller, Neuoetting (DE)

(73) Assignee: Wacker Chemie AG, Munich (DE)

( * ) Notice: Subject to any disclaimer, the term of this patent is extended or adjusted under 35 U.S.C. 154(b) by 145 days.

(21) Appl. No.: 13/054,150

(22) PCT Filed: Jul. 14, 2009

(86) PCT No.: PCT/EP2009/058986
§ 371 (c)(1),
(2), (4) Date: Jan. 14, 2011

(87) PCT Pub. No.: WO2010/015491
PCT Pub. Date: Feb. 11, 2010

(65) Prior Publication Data
US 2011/0124752 A1    May 26, 2011

(30) Foreign Application Priority Data
Aug. 7, 2008   (DE) .................. 10 2008 041 097

(51) Int. Cl.
C08G 77/04   (2006.01)
C08G 77/38   (2006.01)
C08J 9/02    (2006.01)

(52) U.S. Cl.
USPC ............... 521/110; 521/77; 521/99; 521/154

(58) Field of Classification Search
USPC ........................................ 521/154
See application file for complete search history.

(56) References Cited

U.S. PATENT DOCUMENTS

| | | | | |
|---|---|---|---|---|
| 3,294,739 | A | * | 12/1966 | Weyenberg ............... 528/17 |
| 4,368,279 | A | * | 1/1983 | Modic et al. .............. 521/122 |
| 5,332,762 | A | | 7/1994 | Maschberger et al. |
| 6,020,389 | A | | 2/2000 | Hoheneder |
| 7,135,418 | B1 | | 11/2006 | Papasouliotis |
| 2004/0127668 | A1 | * | 7/2004 | Rubinsztajn et al. ........ 528/12 |
| 2008/0227930 | A1 | | 9/2008 | Lautenschlager et al. |
| 2008/0281007 | A1 | | 11/2008 | Weidinger |
| 2009/0156737 | A1 | | 6/2009 | Schindler et al. |

FOREIGN PATENT DOCUMENTS

| | | |
|---|---|---|
| CA | 2 308 568 A1 | 5/1999 |
| DE | 41 01 884 A1 | 7/1992 |
| DE | 197 50 697 A1 | 5/1999 |
| DE | 198 11 484 | 9/1999 |
| DE | 19811484 A1 * | 9/1999 |
| DE | 10 2005 053 697 A1 | 5/2007 |
| DE | 10 2006 022 095 A1 | 11/2007 |
| EP | 0 355 429 B1 | 2/1990 |
| EP | 0 416 229 A2 | 3/1991 |
| EP | 0 553 889 B1 | 8/1993 |
| EP | 0 751 173 B1 | 1/1997 |
| EP | 0 506 241 B1 | 5/1997 |
| JP | 63-282381 A2 | 11/1988 |
| JP | 7-292504 | 11/1995 |
| KR | 2001-0077825 A | 8/2001 |
| WO | WO 2005/035630 A1 | 4/2005 |
| WO | WO 2006/133769 A1 | 12/2006 |

OTHER PUBLICATIONS

Machine Translation of DE 19811484, inventor G. Marquardt, Sep. 1999.*
Brook, Michael A. From Chapter 9 "Silicones" (2000). Silicon in Organic, Organometallic, and Polymer Chemistry.. John Wiley & Sons. p. 284 Online version available at: http://www.knovel.com/web/portal/browse/display?_EXT_KNOVEL_DISPLAY_bookid=4653&VerticalID=0.*
PatBase Abstract for EP 0 416 229 A2, 1991.
Reinl, W., Erkrankungen durch Tetramethylbernsteinsäuredinitril bei der Schaumstoffherstellung [Pathological Effects of Tetramethylsuccinonitrile in Foam Production], Archiv für Toxikologie, vol. 16, p. 367380, 1957.
Azobisisobutyronitrile [Azobisisobutyronitriles], Health Council of the Netherlands, 2002, Publication 2002/01 OSH.
PatBase Abstract for EP 0 751 173 B1, 1997.
PatBase Abstract for JP 7-292504 A1, 1995.
PatBase Abstract for KR 2001-0077825 A, 2001.
PatBase Abstract for JP 63-282381 A2, 1998.
PatBase Abstract for DE 41 01 884 A1, 1992.
Adv. Mater. 2001, 13, 331-335 (Don Tilley et al.).
Bull. Chem. Soc. Japan 1969, 42, 1118-1123 (Y. Abe et al.).
J. Beckmann et al., in Appl. Organomet. Chem. 2003, 17, 52-62.
J. Photopolym. Sci. Tech. 1992, 5, 181-190, M. Sakata et al.
International Search Report for PCT/EP2009/058986.

* cited by examiner

*Primary Examiner* — Randy Gulakowski
*Assistant Examiner* — Christina Wales
(74) *Attorney, Agent, or Firm* — Caesar, Rivise, Bernstein, Cohen & Pokotilow, Ltd.

(57) ABSTRACT

The object of the invention is a method for the production of foams on silicon basis from polymer mixtures (A) containing silicon, wherein at least one compound (V) is used that contributes to the formation of the polymer network, and which carries at least one alkoxy silyl group of the general formula [1a], [1b], or [1c] $\equiv$Si—O—$(R^1)(R^2)(R^3)$ [1a], $\equiv$Si$(R^5)$—O—$C(R^1)(R^2)(R^3)$ [1b], $\equiv$Si—O—C(O)—U [1c], from which upon curing of the polymer mixtures (A) at least one molecule (XY) is split which is gaseous during processing and causes the formation of foam in the polymer mixture (A), and a catalyst (K) selected from a Brönstedt acid, Brönstedt base, Lewis acid, and Lewis base, where $R^1$, $R^2$, $R^3$, $R^5$, and U have the meanings as stated in claim 1, and where polymer mixtures (A) which form $SiO_2$ during the cross-linking process are excluded. The invention further relates to a method, wherein the foam layers, foamed molded bodies, adhesive or sealing masses are produced, and foams on a silicon basis, which can be obtained from the polymer mixtures (A) according to the previous mentioned method.

8 Claims, No Drawings

METHOD FOR THE PRODUCTION OF FOAMS ON SILICONE BASIS

BACKGROUND OF THE INVENTION

The invention relates to a process for the production of platinum-free, silicone-based foams, of foam layers, of foamed moldings, and of adhesive masses or sealants, and also to silicone-based foams.

The prior art in patents and in other literature has numerous examples of foamed plastics items, and also of corresponding blowing systems for foam formation. Plastics components are foamed especially for weight reduction and to achieve new properties. Another desirable feature in elastomer technology is the increase in compressibility. In order to obtain a foam with maximum resistance by way of example to the effects of temperature or of chemicals, it is preferable to use silicone elastomers as main rubber. Elastomer foams are mostly produced by means of chemical blowing agents which liberate gases, such as nitrogen, oxygen, $CO_2$, hydrogen, and water vapor for example at an elevated temperature or via addition of an auxiliary. Foaming is achieved in EP 0 553 889 B1 by way of example by using water and in EP 0 506 241 B1 by using alcohol. However, a disadvantage of these two foaming agents is that they are polar substances which are in principle incompatible with silicone. They therefore have to be emulsified within the elastomer matrix, and this leads to severe restrictions in relation to handling and stability, examples of results being demixing phenomena and inhomogeneity.

Other blowing systems, for example phosphines, are described by way of example in patent EP 0 355 429 B1, and are attended by the same problems.

Hydrogen-based foams, as described by way of example in EP 0 416 229 A2, have very restricted use because they have to be used in situ after mixing of the components.

Furthermore, although these foams can achieve very low densities, they only have low mechanical strengths.

The use of traditional, nitrogen-based blowing agents, such as azodicarbonamide and 2,2'-azobisisobutyronitrile AIBN is moreover not considered to be useful in achieving the objective, because of toxicological considerations as described by way of example by Reinl, W., Erkrankungen durch Tetramethylbernsteinsäuredinitril bei der Schaumstoffherstellung [Pathological Effects of Tetramethylsuccinonitrile in Foam Production], Archiv für Toxikologie, volume 16, page 367380, 1957, and Azobisisobutyronitrile [Azobisisobutyronitriles], Health Council of the Netherlands, 2002, Publication 2002/01 OSH, and also because of modest compression set, as revealed in example 8, table 1 of said publication.

Finally, there are $CO_2$-forming foams mentioned in the literature, for example in patent specifications DE 197 50 697 A1 and EP 0 751 173 B1, which are based on the decomposition of carbonates. Disadvantages of these foams are the restricted miscibility of the solids with the polymer mixture, and also the foam structure, which is inhomogeneous and not very reproducible.

DE 102005053697A1 describes expandable silicone compositions which, for foam formation, have additions of blowing agents bound within solids, for example taking the form of salts which comprise intercalated liquid or which comprise liquid of crystallization. The foam is preferably formed here by water vapor. Here again, a disadvantage is the restricted miscibility of the solids with the polymer mixture, and the fact that the solids do not contribute to the construction of the network.

Alongside these foam-production methods with their attendant disadvantages, there are also restrictions in the use and processing of the known silicone-based blends.

Some of the methods of production and processing used hitherto in applications of foamed siloxane-containing compositions have a plurality of stages, making them complicated, and/or are based on silicone blends which have to be crosslinked by means of expensive platinum catalysis or by peroxidic systems.

By way of example, JP 7292504 A2 uses platinum to produce a silicone-foam preform by addition-crosslinking, and applies this to a thermoplastic, merely in order to produce cups for swimming costumes.

KR 20010077825 A prefoams a silicone on wax paper, and uses transfer coating to adhesive-bond the same to a previously silicone-adhesive-coated textile in order to obtain a type of synthetic leather.

JP 63282381 A2 proceeds in similarly complicated (multistage) fashion, by using peroxide-crosslinked (therefore highly odorous) solid silicone for adhesive-bonding of silicone foam to textile.

Finally, DE 41 01 884 A1 mentions an addition-crosslinking, i.e. platinum-dependent, silicone mixture which is foamed by means of compressed air.

A disadvantage of the polymers curable via a hydrosilylation process is that the noble-metal catalysts needed for the curing process are very expensive raw materials. The catalysts generally remain within the product and cannot be reclaimed, and this makes the high costs of the noble-metal catalysts particularly problematic.

As an alternative to the noble-metal-catalyzed addition crosslinking process or to the process of peroxidic crosslinking of silicone blends, it is known that the polymer network can be formed via condensation of silanol groups ≡Si—O—H.

If said reactive units are formed from hydrolysable silyl groups present within the blend, examples being ≡Si—O—Ac or ≡Si—Cl, the hardening rate is determined via diffusion of the water to the hydrolysable silyl groups within the polymer to be cured. The hardening of relatively thick layers, occurring by way of example during the production of foams, is in particular frequently an excessively slow process, making it difficult or impossible to use said polymers for a wide variety of applications.

U.S. Pat. No. 7,135,418 B1 describes the deposition, on semiconductor substrates, of $SiO_2$ layers produced via decomposition of alkoxysilanols. To this end, a surface for $SiO_2$ deposition is repeatedly briefly exposed to an atmosphere of a silicon-dioxide-liberating precursor which bears tert-pentoxysilyl groups. The silicon dioxide is formed here at an elevated temperature by way of example from tris(tert-pentoxy)silanol, with elimination of inter alia water and alkenes.

In Adv. Mater. 2001, 13, 331-335 (Don Tilley et al.), the production of mixed oxides is described via thermolysis of molecular precursors bearing tris(tert-butoxy)silyl groups. The mixed oxides are formed here at temperatures of from 90° C. to 150° C., without exposure to (atmospheric) moisture, with elimination of isobutylene and water.

WO 2005/035630 A1 describes tert-butoxy-functional silicone resins.

Bull. Chem. Soc. Japan 1969, 42, 1118-1123 (Y. Abe et al.) describes the uncatalyzed thermal conversion of tert-butoxysil(ox)anes to high-molecular-weight compounds.

J. Beckmann et al., in Appl. Organomet. Chem. 2003, 17, 52-62 describe the synthesis and uncatalyzed thermal condensation of tert-butoxysilanols.

In J. Photopolym. Sci. Techn. 1992, 5, 181-190, M. Sakata et al. describe the conversion of tert-butoxy-functional siloxanes to $SiO_2$ via irradiation with electrons in the presence of photoacids.

There has hitherto been no description within the literature of the use of thermal decomposition of alkoxysilanols or, respectively, alkoxysilyl groups for producing networks, such as foams, made of siloxanes and of organic polymers via the condensation reaction of resultant Si—O—H groups.

There is no process hitherto disclosed which permits the production and processing of silicone-based polymer blends to give foams and which can be implemented at low cost and without technical difficulty, and which entirely or substantially avoids the disadvantages mentioned.

SUMMARY OF THE INVENTION

The invention provides a process for producing silicone-based foams made of silicone-containing polymer blends (A),
by using at least one compound (V) which contributes to the formation of the polymer network and which bears at least one alkoxysilyl group of the general formulae [1a], [1b], or [1c]

  [1a],

  [1b],

  [1c], and from which at least one molecule (XY) is eliminated during curing of the polymer blends (A), where this molecule is gaseous during processing and causes foaming in the polymer blend (A),
and also a catalyst (K) which is selected from a Bronsted acid, Bronsted base, Lewis acid, and Lewis base,
where
$R^1$, $R^2$, and $R^3$ are hydrogen, a halogen, or a moiety bonded by way of a carbon atom, where the moieties $R^1$, $R^2$, and $R^3$ can have bonding to one another, or are a divalent moiety which has bonding by way of a carbon atom and which connects two alkoxysilyl groups of the general formula [1a], [1b], or [1c], with the proviso that at most 2 of the moieties $R^1$, $R^2$, and $R^3$ are hydrogen, and alkoxysilyl moieties of the formula ≡Si—O—$CH_2$—$R^4$ have been excluded,
$R^4$ is an unbranched aliphatic hydrocarbon moiety having from 1 to 12 carbon atoms,
$R^5$ is hydrogen, a halogen, an unsubstituted or substituted aliphatic, olefinic, or aromatic hydrocarbon moiety having from 1 to 12 carbon atoms, an OH group, an —$OR^6$ group, —$OC(O)R^6$ group, —$OC(O)OR^6$ group, —$OC(O)OM$ group, a metaloxy moiety M—O—, or $CH_2$—W, where W is a heteroatom, the free valencies of which have been satisfied by hydrocarbon moieties,
U is an —$OR^6$ group, or an —$NR^{6a}R^{6b}$ group,
$R^6$, $R^{6a}$, and $R^{6b}$ are hydrogen, or an unsubstituted or substituted aliphatic, olefinic, or aromatic hydrocarbon moiety having from 1 to 12 carbon atoms, and
M is a metal atom which can have free valencies which have been saturated by ligands, and
where polymer blends (A) which form $SiO_2$ during the crosslinking process have been excluded.

From the silicone-containing polymer blends (A) it is possible to produce silicone-based foams in which
1) the network is constructed without use of noble-metal catalysts, such as platinum metals, and in particular without platinum,
2) the foam is formed via cleavage products which are formed during the construction of the polymer network, and
3) a flowable blend is obtained with processing time sufficiently long for the production of foams and/or of foams on substrates.

DETAILED DESCRIPTION OF PREFERRED EMBODIMENTS

Foams are formed via curing of the polymer blends (A) in the form of moldings or layers on or between supports. The polymer blends (A) can be cured thermally in a thick layer without exposure to (atmospheric) moisture.

The valencies indicated by ≡Si at the silicon atoms in the general formulae [1a], [1b], and [1c] can have been satisfied by any desired moieties.

The moieties $R^1$, $R^2$, and $R^3$ are in particular hydrogen, chlorine, an unsubstituted or substituted aliphatic, olefinic, or aromatic hydrocarbon moiety, or a siloxane moiety bonded by way of a carbon atom, or are a carbonyl group —$C(O)R^6$, a carboxylic ester group —$C(O)OR^6$, a cyano group —C≡N, or an amide group —$C(O)NR^{6a6b}$, where $R^6$, $R^{6a}$, and $R^{6b}$ assume the definitions given above. The moieties $R^1$, $R^2$, and $R^3$ preferably have from 1 to 12, in particular from 1 to 6, carbon atoms. It is preferable that the moieties $R^1$, $R^2$, and $R^3$ are methyl, ethyl, propyl, vinyl, or phenyl moieties, or carboxy moieties —$C(O)OCH_3$.

It is particularly preferable that the moieties $R^1$, $R^2$, and $R^3$ are methyl, ethyl, or propyl moieties.

Two or three of the moieties $R^1$, $R^2$, and $R^3$ can have bonding to one another, and by way of example $R^2$ and $R^3$ can have been formed from a diol.

The moieties $R^5$ are preferably hydrogen, chlorine, methyl, ethyl, propyl, phenyl, methoxy, ethoxy, acetoxy, vinyl, OH, carbonate, a metaloxy moiety —O-M, or a —$CH_2$—W moiety, where the heteroatom W is preferably N, O, P, or S, the free valencies of which have preferably been satisfied by alkyl or aryl moieties preferably having from 1 to 10 carbon atoms.

The moieties $R^6$, $R^{6a}$, and $R^{6b}$ are preferably hydrogen, methyl, ethyl, propyl, vinyl, or phenyl.

The moieties M are preferably metal atoms which are selected from lithium, sodium, potassium, calcium, magnesium, boron, aluminum, zirconium, gallium, iron, copper, titanium, zinc, bismuth, cerium, and tin. In the case of polyvalent metals, the free valencies on the metal have been satisfied via halides, preferably chloride and bromide, alkoxide groups, preferably methoxy, ethoxy, or isopropoxy moieties, alkyl moieties, preferably methyl, ethyl, and phenyl groups, carboxylic acid moieties, preferably carboxylic acid moieties having from 2-16 carbon atoms, or by familiar mono- or polydentate complexing ligands which are typically used in organometallic synthesis (e.g. acetylacetone).

It is preferable that the ≡Si—O—C($R^1$)($R^2$)($R^3$) moieties of the general formula [1a] bear a hydrogen atom in the β-position with respect to the oxygen. Preferred examples are groups of the formulae [3]-[9]

  [3],

  [4],

  [5],

  [6],

  [7],

  [8],

  [9].

The compounds (V) can be low-molecular-weight compounds (N) or high-molecular-weight and/or polymeric compounds (P).

In one preferred embodiment of the invention, the compounds (V) are low-molecular-weight compounds (N) which bear at least one group of the general formula [1a]. The low-molecular-weight compounds (N) typically take the form of silanes of the general formula [10]

$R^{5a}{}_{4-n}Si(O-C(R^1)(R^2)(R^3))_n$     [10]

or of their hydrolysis and condensation products,
where
n has the values 1, 2, or 3,
the definitions of $R^{5a}$ are the same as those of $R^5$, and
the definitions of $R^1$, $R^2$, $R^3$, and $R^5$ are those mentioned above.

It is particularly preferable that compounds (N) used comprise the substances of the formulae [11]-[22]

LSi(O—C(CH$_3$)$_3$)$_3$     [11],

L$_2$Si(O—C(CH$_3$)$_3$)$_2$     [12],

L$_3$Si(O—C(CH$_3$)$_3$)     [13],

LSi(O—C(CH$_3$)$_2$C$_2$H$_5$)$_3$     [14],

L$_2$Si(O—C(CH$_3$)$_2$C$_2$H$_5$)$_2$     [15],

L$_3$Si(O—C(CH$_3$)$_2$C$_2$H$_5$)     [16],

LSi(O—CH(CH$_3$)(C$_6$H$_5$))$_3$     [17],

L$_2$Si(O—CH(CH$_3$)(C$_6$H$_5$))$_2$     [18],

L$_3$Si(O—CH(CH$_3$)(C$_6$H$_5$))     [19],

LSi(O—CH(CH$_3$)C(O)OCH$_3$)$_3$     [20],

L$_2$Si(O—CH(CH$_3$)C(O)OCH$_3$)$_2$     [21],

L$_3$Si(O—CH(CH$_3$)C(O)OCH$_3$)     [22], and their hydrolysis and condensation products,
where
L are Cl, OH, methyl, ethyl, vinyl, phenyl, a carboxy moiety having from 1-6 carbon atoms, an alkoxy moiety having from 1-6 carbon atoms, or a metaloxy moiety $M^a$-O—, and
$M^a$ assumes the definitions of M.

It is very particularly preferable that compounds (N) used comprise the substances of the formulae [23]-[70], HOSi(O—C(CH$_3$)$_3$)$_3$     [23], (HO)$_2$Si(O—C(CH$_3$)$_3$)$_2$     [24], (HO)$_3$Si(O—C(CH$_3$)$_3$)     [25], HOSi(O—C(CH$_3$)$_2$C$_2$H$_5$)$_3$     [26], (HO)$_2$Si(O—C(CH$_3$)$_2$C$_2$H$_5$)$_2$     [27], (HO)$_3$Si(O—C(CH$_3$)$_2$C$_2$H$_5$)     [28], HOSi(O—CH(CH$_3$)(C$_6$H$_5$))$_3$     [29], (HO)$_2$Si(O—CH(CH$_3$)(C$_6$H$_5$))$_2$     [30], (HO)$_3$Si(O—CH(CH$_3$)(C$_6$H$_5$))     [31], HOSi(O—CH(CH$_3$)C(O)OCH$_3$)$_3$     [32], (HO)$_2$Si(O—CH(CH$_3$)C(O)OCH$_3$)$_2$     [33], (HO)$_3$Si(O—CH(CH$_3$)C(O)OCH$_3$)     [34], MeOSi(O—C(CH$_3$)$_3$)$_3$     [35], (MeO)$_2$Si(O—C(CH$_3$)$_3$)$_2$     [36], (MeO)$_3$Si(O—C(CH$_3$)$_3$)     [37], MeOSi(O—C(CH$_3$)$_2$C$_2$H$_5$)$_3$     [38], (MeO)$_2$Si(O—C(CH$_3$)$_2$C$_2$H$_5$)$_2$     [39], (MeO)$_3$Si(O—C(CH$_3$)$_2$C$_2$H$_5$)     [40], MeOSi(O—CH(CH$_3$)(C$_6$H$_5$))$_3$     [41], (MeO)$_2$Si(O—CH(CH$_3$)(C$_6$H$_5$))$_2$     [42], (MeO)$_3$Si(O—CH(CH$_3$)(C$_6$H$_5$))     [43], MeOSi(O—CH(CH$_3$)C(O)OCH$_3$)$_3$     [44], (MeO)$_2$Si(O—CH(CH$_3$)C(O)OCH$_3$)$_2$     [45], (MeO)$_3$Si(O—CH(CH$_3$)C(O)OCH$_3$)     [46], MeC(O)OSi(O—C(CH$_3$)$_3$)$_3$     [47], (MeC(O)O)$_2$Si(O—C(CH$_3$)$_3$)$_2$     [48], (MeC(O)O)$_3$Si(O—C(CH$_3$)$_3$)     [49], MeC(O)OSi(O—C(CH$_3$)$_2$C$_2$H$_5$)$_3$     [50], (MeC(O)O)$_2$Si(O—C(CH$_3$)$_2$C$_2$H$_5$)$_2$     [51], (MeC(O)O)$_3$Si(O—C(CH$_3$)$_2$C$_2$H$_5$)     [52], MeC(O)OSi(O—CH(CH$_3$)(C$_6$H$_5$))$_3$     [53], (MeC(O)O)$_2$Si(O—CH(CH$_3$)(C$_6$H$_5$))$_2$     [54], (MeC(O)O)$_3$Si(O—CH(CH$_3$)(C$_6$H$_5$))     [55], MeC(O)OSi(O—CH(CH$_3$)C(O)OCH$_3$)$_3$     [56], (MeC(O)O)$_2$Si(O—CH(CH$_3$)C(O)OCH$_3$)$_2$     [57], (MeC(O)O)$_3$Si(O—CH(CH$_3$)C(O)OCH$_3$)     [58], ClSi(O—C(CH$_3$)$_3$)$_3$     [59], Cl$_2$Si(O—C(CH$_3$)$_3$)$_2$     [60], Cl$_3$Si(O—C(CH$_3$)$_3$)     [61], ClSi(O—C(CH$_3$)$_2$C$_2$H$_5$)$_3$     [62], Cl$_2$Si(O—C(CH$_3$)$_2$C$_2$H$_5$)$_2$     [63], Cl$_3$Si(O—C(CH$_3$)$_2$C$_2$H$_5$)     [64], ClSi(O—CH(CH$_3$)(C$_6$H$_5$))$_3$     [65], Cl$_2$Si(O—CH(CH$_3$)(C$_6$H$_5$))$_2$     [66], Cl$_3$Si(O—CH(CH$_3$)(C$_6$H$_5$))     [67], ClSi(O—CH(CH$_3$)C(O)OCH$_3$)$_3$     [68], Cl$_2$Si(O—CH(CH$_3$)C(O)OCH$_3$)$_2$     [69], Cl$_3$Si(O—CH(CH$_3$)C(O)OCH$_3$)     [70], and their hydrolysis and condensation products, where Me is a methyl moiety.

In another embodiment of the invention, the compounds (V) are high-molecular-weight and/or polymeric compounds (P) in which the alkoxysilyl groups of the general formulae [1a], [1b], or [1c] have covalent linkage by way of the free valencies on the silicon atom to one or more polymer moieties (PR). It is equally possible that the moieties $R^1$, $R^2$, and $R^3$ are, or comprise, polymer moieties (PR), where said moieties (PR) have bonding by way of a carbon spacer to the carbon atom of the general formulae [1a], [1b], or [1c].

Polymer moieties (PR) that can be used here are any of the organic polymers and organopolysiloxanes. Examples of suitable polymers, in unbranched and branched form, are polyolefins, e.g. polyethylene, polystyrene, polypropylenes, polyethers, polyesters, polyamides, polyvinyl acetates, polyvinyl alcohols, polyurethanes, polyacrylates, epoxy resins, polymethacrylates, and also organopolysiloxanes, such as linear, branched, and cyclic organopolysiloxanes, and organopolysiloxane resins and their copolymers.

Examples of polymers (P) in which the polymer moieties (PR) have covalent linkage to the free valencies on the silicon atom of the alkoxysilyl groups of the general formulae [1a], [1b], or [1c] are polyethylenes or polyvinyl acetates, where these bear, along the chain, alkoxysilyl groups of the general formula [1] or [2].

Examples of polymers (P) in which the polymer moieties (PR) respectively, independently of one another, correspond to the moieties $R^1$, $R^2$, and $R^3$, or respectively, independently of one another, are portions of the moieties $R^1$, $R^2$, and $R^3$ are polysiloxanes of the general formula [71]

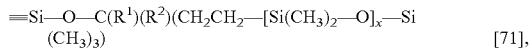

[71], where x is an integer from 10 to 100, and the free valencies indicated by ≡Si on the silicon atom have been saturated by any desired moieties.

Preferred polymers (P) are linear, branched, and cyclic organopolysiloxanes of the general formula [72]

$(R^7{}_3SiO_{1/2})_a(R^7{}_2SiO_{2/2})_b(R^7SiO_{3/2})_c(SiO_{4/2})_d$ [72], where $R^7$ assumes the definition of the moiety $R^5$, and at least one moiety $R^7$ assumes the definition —O—C($R^1$)($R^2$)($R^3$), a, b, c, and d are an integral value greater than or equal to 0, with the proviso that the sum a+b+c is at least 1, and $R^1$, $R^2$, $R^3$, and $R^5$ respectively, independently of one another, can assume the definitions mentioned above.

The moieties $R^7$ are preferably a methyl, ethyl, propyl, butyl, octyl, phenyl, or OH group, or methoxy, ethoxy, propoxy, butoxy, acetoxy, or an —O—C($R^1$)($R^2$)($R^3$) group.

It is particularly preferable that the polymers (P) are linear siloxanes which bear, in terminal or lateral position, alkoxysilyl groups of the general formulae [1a], [1b], or [1c].

Widely-used synthetic methods familiar to the person skilled in the art can be used to produce the alkoxysilyl-functional polymers (P). By way of example, alkoxysilyl-functional polyethylenes can be obtained via coordinative polymerization, e.g. by means of Ziegler-Natta catalysts or of metallocene catalysts, or via free-radical grafting of a vinyl-functional alkoxysilane which bears groups of the general formulae [1a], [1b], or [1c] onto a polyethylene. By way of example, an alkoxysilyl-functional polyvinyl acetate can be produced via free-radical polymerization of a vinyl-functional alkoxysilane which bears groups of the general formulae [1a], [1b], or [1c] with vinyl acetate. To produce an alkoxysilane-modified polymethacrylate which bears groups of the general formulae [1a], [1b], or [1c], an alkoxysilane having a methacrylic function can be copolymerized with a methacrylate. By way of example, alkoxysilane-functional polyurethanes can be produced via reaction of an isocyanate-functional prepolymer with an amino-functional alkoxysilane which bears groups of the general formulae [1a], [1b], or [1c].

By way of example, alkoxysilyl-functional polymers (P) can be produced via reaction of an α,ω-SiOH-functional siloxane or SiOH-functional silicone resin with silanes of the general formula [10]

[10]

or with their hydrolysis and condensation products, where n has the values 1, 2, or 3, and the definitions of $R^1$, $R^2$, $R^3$ and $R^{5a}$ are the same as those mentioned above, or condensation of the silanes of the general formula [10], or cocondensation of the silanes of the general formula [10], with the silanes of the general formula [73],

[73], or their hydrolysis and condensation products, where

Y is hydrogen, an OH group, halogen, an alkoxy group having from 1 to 12 carbon atoms, or a carboxy moiety having from 1 to 12 carbon atoms, $R^8$ is an optionally heteroatom-substituted aliphatic or aromatic hydrocarbon moiety having from 1 to 12 carbon atoms, and e can assume the values 1, 2, 3, and 4, or the process known to the person skilled in the art that equilibrates an organopolysiloxane of the general formula [72] with one or more silanes of the general formula [10], or with their hydrolysis or condensation products.

The compounds (V) comprise on average from 1 to 10 000 alkoxysilyl groups of the general formulae [1a], [1b], or [1c] per molecule. If the compound (V) is a low-molecular-weight compound (N), the number of alkoxysilyl groups of the general formulae [1a], [1b], or [1c] is preferably equal to 1. The number of moieties —O—C($R^1$)($R^2$)($R^3$) per alkoxysilyl group is 1, 2, or 3. The number is particularly preferably 2 or 3.

If the compounds (V) are polymers (P), the number of alkoxysilyl groups of the general formulae [1a], [1b], or [1c] is preferably from 1 to 10 000. It is particularly preferable that the number of alkoxysilyl groups of the general formulae [1a], [1b], or [1c] is from 5 to 1000. The number of moieties —O—C($R^1$)($R^2$)($R^3$) per alkoxysilyl group here is 1, 2, or 3. The number is particularly preferably 2 or 3.

The polymer blends (A) can moreover comprise organic polymers and siloxanes. Preference is given to polymers and siloxanes which bear groups which form SiOH groups via reaction with water or can undergo a condensation reaction with SiOH-bearing molecules, or bear SiOH groups. Examples of these organic polymers and siloxanes are SiOH-functional silicone oils and silicone resins, and also siloxanes and organic polymers which bear hydrolysable Si—O alkyl groups, for example those described in DE 10 2006 022 095 A1.

It is particularly preferable that the polymer blends (A) comprise linear, branched, or cyclic organopolysiloxanes of the general formula [72], where $R^7$ assumes the definition of the moiety $R^5$, a, b, c, and d are an integral value greater than or equal to 0, with the proviso that the sum a+b+c is at least 1, and $R^1$, $R^2$, $R^3$, and $R^5$ can assume the abovementioned definitions, where the moieties $R^7$ are preferably a methyl, ethyl, propyl, butyl, octyl, phenyl, or OH group, or methoxy, ethoxy, propoxy, butoxy, acetoxy, or an —O—C($R^1$)($R^2$)($R^3$) group.

It is particularly preferable that the linear, branched, or cyclic organopolysiloxanes of the general formula [72] used as constituent of the polymer blend (A) are siloxanes which bear alkoxysilyl groups in terminal and/or lateral position, or which bear OH groups in terminal position.

The molecules (XY) produced in the process of the invention via elimination from the compounds (V) preferably take the form of gaseous molecules under the conditions of processing, where these lead to formation of foam in the polymer blend (A), and the molecules (XY) produced can be inorganic or organic compounds. By way of example, the molecules (XY) can be hydrocarbons, such as alkanes, alkenes, alkynes, or aromatics, or alcohols, ethers, amines, esters, amides, heterocycles, $CO_2$, nitrogen, or water.

It is preferable that the molecules (XY) are unsaturated organic compounds and carbon dioxide, and it is particularly preferable that they are unsaturated organic compounds of the general formula [73a]

$$(R^{10})(R^{11})C=C(R^{12})(R^{13}) \quad [73a],$$

where the definitions of $R^{10}$, $R^{11}$, $R^{12}$, and $R^{13}$ are as mentioned for $R^1$, $R^2$, and $R^3$ above.

The compounds [74]-[87] are examples of particularly preferred molecules (XY).

$$(CH_3)_2C=CH_2 \quad [74],$$

$$(CH_3)_2C=CH-CH_3 \quad [75],$$

$$(CH_3)(C_2H_5)C=CH_2 \quad [76],$$

$$(CH_3)(C_6H_5)C=CH_2 \quad [77],$$

$$(CH_3)(C_2H_5)C=CH-CH_3 \quad [78],$$

$$(C_2H_5)_2C=CH-CH_3 \quad [79],$$

$$(C_2H_5)_2C=CH_2 \quad [80],$$

$$H_2C=C(CH_3)(CO_2CH_3) \quad [81],$$

$$H_2C=C(CH_3)(CO_2C_2H_5) \quad [82],$$

$$H_2C=C(CO_2CH_3)_2 \quad [83],$$

$$H_2C=C(CO_2C_2H_5)_2 \quad [84],$$

$$(C_6H_5)CH=CH_2 \quad [85],$$

$$H_2C=CH(CO_2CH_3) \quad [86],$$

$$H_2C=CH(CO_2C_2H_5) \quad [87].$$

In the process of the invention, the compounds (XY) are preferably produced via conversion of the alkoxysilyl groups of the formulae [1a], [1b], or [1c], for example via cleavage induced thermally, induced by a free-radical mechanism, or induced via radiation.

The compounds (XY) can by way of example be formed as shown in equations [a]-[c].

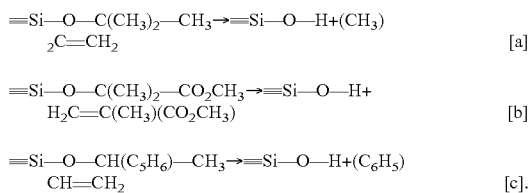

It is preferable that reactive groups are produced during formation of the molecules (XY) from the compounds (V), an example being a silanol =Si—O—H, where these are capable of reaction with one another or with other functional groups which are present in the polymer blend and which are capable of undergoing the condensation reaction, examples being other silanol groups =Si—OH, alkoxysilyl groups, or Si—Cl groups, and which thus contribute to the curing of the polymer blend (A).

Preferred catalysts (K) are Lewis acids and Bronsted acids. Examples of suitable Lewis acids are tin, tin oxide, and also tin compounds, for example dibutyltin dilaurate (DBTL), titanium, titanium oxide, and also titanium compounds, for example titanium (IV) isopropanolate, copper, copper oxide, and also copper compounds, for example copper (I) trifluoromethanesulfonate, iron, iron oxide, and also iron compounds, for example iron (III) chloride, iron (III) acetylacetonate, manganese, manganese oxide, and also manganese compounds, e.g. manganese (II) acetylacetonate, aluminum, aluminum oxide, and also aluminum compounds, e.g. aluminum (III) chloride, aluminum (III) isopropanolate, trimethylaluminum, boron, boron oxide, and also boron compounds, e.g. boron trichloride, zirconium, zirconium oxide, and also zirconium compounds, e.g. Zr (IV) acetylacetonate, gallium, gallium oxide, and also gallium compounds, e.g. gallium (III) acetylacetonate, cerium, cerium oxide, and also cerium compounds, e.g. cerium (III) chloride, and zinc, zinc oxide, and also zinc compounds, e.g. zinc laurate and/or zinc pivalate. Examples of suitable Bronsted acids are carboxylic acids, for example lauric acid, sulfonic acids, for example trifluoromethanesulfonic acid, p-toluene-sulfonic acid, and dodecylbenzenesulfonic acid, and mineral acids, for example hydrochloric acid, nitric acid, and phosphoric acid. Other suitable compounds are those which on irradiation with high-energy radiation, for example UV light or electron beams, decompose to liberate protons. Examples that may be mentioned of compounds of this type are diaryliodonium compounds, for example {4-[(2-hydroxytetradecyl)oxy]phenyl}phenyl-iodonium hexafluoroantimonate, diphenyliodonium nitrate, bis(4-tert-butylphenyl)iodonium p-toluene-sulfonate, bis(4-tert-butylphenyl)iodonium trifluoro-methanesulfonate, triarylsulfonium compounds, for example triphenylsulfonium trifluoromethanesulfonate, 4-(thiophenoxyphenyl)diphenylsulfonium hexafluoro-antimonate, (4-bromophenyl)diphenylsulfonium trifluoro-methanesulfonate, and N-hydroxynaphthalimide trifluoromethanesulfonate, and also 2-(4-methoxy-styryl)-4,6-bis(trichloromethyl)-1,3,5-triazine.

Particular catalysts (K) used are those which accelerate condensation between two silanol groups, between one silanol group and one alkoxysilyl group, between one silanol group and one Si—Cl group, and/or between one alkoxysilyl group or Si—Cl group and water. It is also possible to use a mixture of various catalysts (K). The concentration preferably used of the catalyst (K) is at least 10 ppm, particularly at least 0.1% by weight, based in each case on the polymer blend (A). The concentration used of the catalyst (K) is preferably at most 20% by weight, particularly at most 10% by weight, in particular at most 5% by weight, based in each case on the polymer blend (A).

The polymer blends (A) can be solvent-free or else solvent-containing blends. Examples of suitable organic solvents are gasolines, n-heptane, benzene, toluene, xylenes, halogenated alkanes having from 1 to 6 carbon atoms, ethers, esters, for example ethyl acetate, ketones, for example acetone or methyl ethyl ketone, amides, for example dimethylacetamide, and dimethyl sulfoxide, and alcohols, for example ethanol, n-propanol, isopropanol, or n-butanol.

The polymer blends (A) can moreover comprise additives (Q), e.g. flow-control aids, water scavengers, fungicides, flame retardants, dispersing agents, dyes, plasticizers, heat stabilizers, agents for adjusting release force, antimisting additives, as described for example in WO 2006/133769, odorants, surfactant substances, adhesion promoters, fibers, for example glass fibers or synthetic fibers, light stabilizers, such as UV absorbers, and free-radical scavengers, and particulate fillers, for example carbon black, pigments, e.g. iron oxide black, quartz, talc, fumed silica, chalks, or aluminum oxide.

Additives (Q) particularly preferably used comprise precipitated and fumed silicas, and also mixtures of the same. The specific surface area of said fillers should be at least 50 m$^2$/g or preferably in the range from 100 to 400 m$^2$/g, determined by the BET method. The silica fillers mentioned can be hydrophilic, can have been hydrophobized by known methods, or can have other types of chemical surface-functionalization. The content of additives (Q) in the polymer blends (A) is typically in the range from 0 to 70% by weight, preferably from 0 to 50% by weight.

The polymer blends (A) can moreover comprise compounds (I) which form free radicals when exposed to thermal effects or by virtue of irradiation with UV light. Examples of said compounds (I) are thermal and photochemical polymerization initiators known to the person skilled in the art, as described by way of example in "Handbook of Free Radical Initiators" by E. T. Denisov, T. G. Denisova and T. S. Pokidova, Wiley-Verlag, 2003.

Examples of thermal initiators (I) are tert-butyl peroxide, tert-butyl peroxipivalate, tert-butyl 2-ethylperoxohexanoate, dibenzoyl peroxide, dilauroyl peroxide, azobisisobutyronitrile, tert-butyl peroxobenzoate, or cumyl hydroperoxide. Examples of photoinitiators (I) are benzophenone, 2-hydroxy-2-methyl-1-phenyl-1-propanone, 1-hydroxycyclohexyl phenyl ketone, or methyl benzoylformate.

The individual components can be mixed with one another in any desired sequence to produce the polymer blends (A). The polymer blends (A) here can be produced continuously or batchwise. The polymer blends (A) can preferably be produced in the form of single-component (1C) systems or of two-component (2C) systems.

In the process for producing silicone-based foams, the polymer blends (A) are preferably brought, for from 1 s to 48 h, to a temperature at which the molecules (XY) produced via reaction of the compound (V) are gaseous and cause foaming of the mixture. The foam can be formed during the processing of the polymer blends (A) at atmospheric pressure (=air pressure prevailing at the location of processing), or at reduced pressure of, for example, from 0.01 to 0.1 MPa, or else at elevated pressure. The processing preferably takes place at reduced pressure or atmospheric pressure. The processing particularly preferably takes place at atmospheric pressure.

It is preferable that the polymer blends (A) are heated to a temperature of at least 5° C., particularly preferably at least 20° C., in particular at least from 80° C. to 300° C., particularly preferably up to 250° C., in particular up to 200° C. If the polymer blends (A) comprise, as compounds (V), polymers (P) where polymer moieties (PR) of these are organopolysiloxanes, the curing process is preferably carried out at a temperature of from 5° C. to 200° C. If, on the other hand, the polymer blends (A) comprise, as compounds (V), low-molecular-weight compounds (N), or polymers (P) where polymer moieties (PR) of these are organic polymer moieties, the curing process takes place at from 5° C. to 300° C.

Energy sources preferably used for the crosslinking of the polymer blends (A) via heating are ovens, e.g. convection ovens, heated ducts, heated rolls, heated plates, infrared heat sources, or microwaves. The polymer blends (A) can also be crosslinked via irradiation with ultraviolet light or electron beams.

In one particularly preferred embodiment of the process, the curing process takes place via thermal decomposition of the alkoxysilyl group of the general formula [1] with formation of silanol groups ≡Si—OH, and subsequent condensation of the silanol groups ≡Si—OH with one another or with other functional groups capable of the condensation reaction and present in the polymer blend, for example silanol groups ≡Si—OH, alkoxysilyl groups, or Si—Cl groups.

The polymer blends (A) can preferably be processed in the form of single-component (1C) or two-component (2C) systems. The polymer blend (A) in the form of a 1C system is heated for the curing process without addition of further components, as described.

In the case of a 2C system, the following constituents stored separately from one another: compound (V) and catalyst (K) are mixed to give the polymer blend (A) only shortly prior to processing with the other components. It is possible here that compound (V) or catalyst (K) forms, in each case with constituents of the polymer blend (A), mixtures that are stable in storage.

The time for which the polymer blends (A) are processable (=pot life) can be adjusted via addition of additives (Q) or of solvents. It is preferable to adjust the pot life via addition of solvents, for example alcohols, and particularly via addition of ethanol, n-propanol, isopropanol, or n-butanol.

The process of the invention for producing foams via platinum-free curing of the polymer blends (A) can be used for any of the applications that typically use processes for producing polymers in the form of foams, in particular elastomeric siloxanes in the form of foams, silicone resins in the form of foams, and organic polymers in the form of foams.

The process of the invention is particularly suitable for producing foam layers and foamed moldings on and between textile fabrics, e.g. wovens, nonwovens, drawn-loop knits, laid scrims, formed-loop knits, felts, or warp knits. The textile fabrics here can have been manufactured from natural fibers, such as cotton, wool, silk, etc., or else from synthetic fibers, such as polyolefin, polyester, polyamide, aramid, etc., or else from mineral fibers, e.g. glass or silicates, or metal fibers. One preferred use of the process is the production of elastic foam laminates on textile fabrics and between textile fabrics.

The process of the invention can moreover be used for producing foam layers and foamed moldings on and between surfaces made of mineral substances, e.g. stone, brick, plate, concrete, render, plastic, or natural substances, or metals. The foam layers and foamed moldings produced by the process of the invention are also materials that are suitable for coverings which are used on metals and which have heat-resistant and damping properties. The temperature at which the foam layers and foamed moldings can be used is up to 700° C., depending on their constitution. Examples of applications that may be mentioned for these materials are grill components, oven components, engine components, exhaust components, and other engineering elements in vehicle construction and in aerospace technology.

The foam layers and foamed moldings produced by the process of the invention can likewise improve the corrosion-resistance of the coated materials.

The process of the invention is likewise suitable for producing foam layers and foamed moldings on and between paper, plastics foils (e.g. polyethylene foils, polypropylene foils, polyester foils), wood, cork, silicatic and metallic substrates, and also other polymeric substrates, e.g. polycarbonate, polyurethane, polyamide, and polyester.

The paper used can be low-quality grades of paper, such as absorbent papers, inclusive of kraft paper which is untreated, i.e. not pretreated with chemicals and/or with polymeric natural substances and which has a weight of from 60 to 150 g/m$^2$, unsized papers, papers with low freeness value, mechanical papers, unglazed or uncalendered papers, papers which are smooth on one side following use of a dry-glazing cylinder during their production, without any additional complicated measures, uncoated papers, or papers produced from waste paper. The paper can also be a high-quality grade of paper, examples being low-absorbency papers, sized papers, papers with high freeness value, chemical papers, calendered or glazed papers, glassine papers, parchmentized papers, or precoated papers.

The foils and papers covered by the process of the invention with foam layers and with foamed moldings are suitable by way of example for producing release papers, backing papers, and interleaving papers, including interleaving papers which are used in the production of, for example, cast foils or decorative foils, or of foams. They are also suitable for producing release, backing, and interleaving papers and, respectively, foils and, respectively, fabrics for equipping the reverse faces of self-adhesive tapes or self-adhesive foils, or the inscribed faces of self-adhesive labels.

The process of the invention for the production of foam layers and of foamed moldings is also suitable for equipping packaging material, such as that made from paper, from cardboard boxes, from metal foils, and from drums, which are intended by way of example for the storage and/or the transport of sticky products, such as adhesives and sticky foods.

Another example of the use of the surfaces covered by the process of the invention is the equipping of supports for the transfer of pressure-sensitive adhesive layers in the context of what is known as the transfer process.

For the purposes of processing in the invention to give foam layers and foamed moldings, the polymer mixture (A) is applied to, and between, the surfaces mentioned by using processes familiar to the person skilled in the art, e.g. doctoring processes, immersion processes, extrusion processes, jet processes, or spray processes, or else spin processes. It is also possible to use any of the types of roller coating methods, such as gravure-roll methods, padding, or application by way of multiroll systems, or else screen printing.

The thickness of the resultant foam layers and foamed moldings is preferably from 0.5 µm to 100 cm, depending on intended application and processing method.

The process of the invention is likewise suitable for producing foamed moldings which enclose a support. By way of example, polymer blends (A) can be processed to give foamed cable sheathing and pipe sheathing.

The process of the invention is likewise suitable for producing adhesives in the form of foam, and (joint) sealants in the form of foam, or cementing compositions in the form of foam. By way of example, there are possible uses in window construction, in the production of aquariums or glass cabinets, and also for the insulation of electrical or electronic apparatus. Typically suitable substrates here are mineral substrates, metals, plastics, glass and ceramics.

The definitions of all of the above symbols in the above formulae are respectively independent of each other. The silicon atom is tetravalent in all of the formulae.

Unless otherwise stated, all quantities and percentages stated are based on weight, all pressures are 0.10 MPa (abs.), and all temperatures are 20° C.

Example 1

Curing of a Polymer Blend

A mixture comprising 18.75 g (1.25 mmol) of α,ω-SiOH-terminated polydimethylsiloxane (Mw=15 000 g/mol; viscosity=from 1000 to 1200 mPas), 0.75 g (2.475 mmol) of tris(tert-pentoxy)silanol [CAS No. 17906-35-3], 0.09 g of n-butanol, and a solution of 0.023 g of dodecylbenzenesulfonic acid in 0.25 mL of ethyl acetate is applied at a layer thickness of 2 mm to a polyamide woven (235 dtex, 150 g/m$^2$). The coated woven is then heated for 4 min. at 170° C. in a convection oven. This gives a foam layer adhering to the polyamide woven.

Example 2

Curing of a Polymer Blend

A mixture comprising 2.2 g of fine-particle silica (BET surface area=130 m$^2$/g), 4.5 g of α,ω-SiOH-terminated polydimethylsiloxane (average Mw=46 000 g/mol; viscosity=from 18 000 to 22 000 mPas), 3.3 g of α,ω-SiOH-terminated polydimethylsiloxane (average Mw=71 000 g/mol; viscosity=from 70 000 to 80 000 mPas), 5.0 g of α,ω-SiOH-terminated polydimethylsiloxane (average Mw=15 000 g/mol; viscosity from 1000 to 1200 mPas), 2.5 g (8.25 mmol) of tris(tert-pentoxy)silanol ([CAS No. 17906-35-3]; Mw=303.03 g/mol), 0.68 g of n-butanol, and a solution of 0.075 g of dodecylbenzenesulfonic acid in 0.8 ml of ethyl acetate is applied at a layer thickness of 2 mm to a polyamide woven (235 dtex, 150 g/m$^2$). The coated woven is then heated for 4 min. at 170° C. in a convection oven. This gives a foam layer adhering to the polyamide woven.

Example 3

Curing of a Polymer Blend

A mixture comprising 12.00 g (0.169 mmol) of α,ω-SiOH-terminated polydimethylsiloxane (average Mw=71 000 g/mol; viscosity=from 70 000 to 80 000 mPas), 1.5 g (4.95 mmol) of tris(tert-pentoxy)silanol ([CAS No. 17906-35-3]; Mw=303.03 g/mol), 0.03 g of n-butanol, and a solution of 0.045 g of dodecylbenzenesulfonic acid in 0.5 ml of ethyl acetate is applied at a layer thickness of 2 mm to a polyamide woven (235 dtex, 150 g/m$^2$). The coated woven is then heated for 4 min. at 170° C. in a convection oven. This gives a foam layer adhering to the polyamide woven.

Example 4

Curing of a Polymer Blend

A mixture comprising 18.75 g (0.408 mmol) of α,ω-SiOH-terminated polydimethylsiloxane (average Mw=46 000 g/mol; viscosity=from 18 000 to 22 000 mPas), 0.75 g (2.48 mmol) of tris(tert-pentoxy)silanol ([CAS No. 17906-35-3]; Mw=303.03 g/mol), and a solution of 0.023 g of dodecylbenzenesulfonic acid in 0.25 ml of ethyl acetate is applied at a layer thickness of 2 mm to a polyamide woven (235 dtex, 150 g/m$^2$). The coated woven is then heated for 4 min. at 170° C. in a convection oven. This gives a foam layer adhering to the polyamide woven.

Example 5

Curing of a Polymer Blend

A mixture comprising 15.63 g (1.04 mmol) of α,ω-SiOH-terminated polydimethylsiloxane (average Mw=15 000 g/mol; viscosity=from 1000 to 1200 mPas), 1.25 g (4.125 mmol) of tris(tert-pentoxy)silanol ([CAS No. 17906-35-3]; Mw=303.03 g/mol), and a solution of 0.0375 g of dodecylbenzenesulfonic acid in 0.41 ml of ethyl acetate is applied at a layer thickness of 2 mm to a polyamide woven (235 dtex, 150 g/m$^2$). The coated woven is then heated for 4 min. at 170° C. in a convection oven. This gives a foam layer adhering to the polyamide woven.

Example 6

Curing of a Polymer Blend

A mixture comprising 15.00 g (1.35 mmol) of α,ω-SiOH-terminated polydimethylsiloxane (average Mw=11 100 g/mol; viscosity=from 450 to 600 mPas), 1.5 g (4.95 mmol) of tris(tert-pentoxy)silanol ([CAS No. 17906-35-3]; Mw=303.03 g/mol), and a solution of 0.045 g of dodecylbenzenesulfonic acid in 0.5 ml of ethyl acetate is applied at a layer thickness of 2 mm to a polyamide woven (235 dtex, 150 g/m$^2$). The coated woven is then heated for 4 min. at 170° C. in a convection oven. This gives a foam layer adhering to the polyamide woven.

Example 7

Curing of a Polymer Blend

A mixture comprising 15.00 g (5 mmol) of α,ω-SiOH-terminated polydimethylsiloxane (average Mw=3000 g/mol; viscosity=from 50 to 100 mPas), 1.36 g (4.65 mmol) of di-tert-butoxydiacetoxysilane ([CAS No. 13170-23-5]; Mw=292.4 g/mol), and a solution of 0.068 g of triphenylsulfonium trifluoromethanesulfonate in 0.5 ml of acetone is applied at a layer thickness of 2 mm to a polyamide woven (235 dtex, 150 g/m$^2$). The coated woven is then irradiated for 30 sec. with UV light of wavelength 254 nm. This gives a foam layer adhering to the polyamide woven.

Example 8

Curing of a Polymer Blend

A mixture comprising 15.00 g (5 mmol) of α,ω-SiOH-terminated polydimethylsiloxane (average Mw=3000 g/mol; viscosity=from 50 to 100 mPas), 1.36 g (4.65 mmol) of di-tert-butoxydiacetoxysilane ([CAS No. 13170-23-5]; Mw=292.4 g/mol), and 2 g of a 4% strength solution of titanium acetylacetonate (CAS No. 97281-09-9) in ethyl acetate is applied at a layer thickness of 2 mm to a polyamide woven (235 dtex, 150 g/m$^2$). The coated woven is then heated for 5 min. at 170° C. in a convection oven. This gives a foam layer adhering to the polyamide woven.

What is claimed is:

1. A process for producing silicone-based foams made of silicone-containing polymer blends (A), comprising forming a polymer network by using:
   (i) at least one compound (V) which contributes to the forming of the polymer network and which bears at least one alkoxysilyl group of the general formulae [1a], [1b], or [1c]

$$\equiv Si-O-C(R^1)(R^2)(R^3) \quad [1a],$$

$$\equiv Si(R^5)-O-C(R^1)(R^2)(R^3) \quad [1b],$$

$$\equiv Si-O-C(O)-U \quad [1c],$$

and from which at least one molecule (XY) is eliminated during curing of the polymer blends (A), where the at least one molecule (XY) is gaseous during processing, causes foaming in the polymer blends (A), and is at least one unsaturated organic compound of the general formula [73a]

$$(R^{10})(R^{11})C=C(R^{12})(R^{13}) \quad [73a], \text{ and}$$

(ii) a catalyst (K) which is a member selected from the group consisting of a Bronsted acid, a Bronsted base, a Lewis acid, and a Lewis base, where moieties $R^1$-$R^5$ have the following definitions $R^1$, $R^2$, and $R^3$ are hydrogen, a halogen, or a moiety bonded by way of a carbon atom, where the moieties $R^1$, $R^2$, and $R^3$ can have bonding to one another, or are a divalent moiety which has bonding by way of a carbon atom and which connects two alkoxysilyl groups of the general formula [1a], [1b], or [1c], with the proviso that at most 2 of the moieties $R^1$, $R^2$, and $R^3$ are hydrogen, and alkoxysilyl moieties of the formula $\equiv Si-O-CH_2-R^4$ are excluded, $R^4$ is an unbranched aliphatic hydrocarbon moiety having from 1 to 12 carbon atoms, $R^5$ is hydrogen, a halogen, an unsubstituted or substituted aliphatic, olefinic, or aromatic hydrocarbon moiety having from 1 to 12 carbon atoms, an OH group, an $-OR^6$ group, an $-OC(O)R^6$ group, an $-OC(O)OR^6$ group, an $-OC(O)OM$ group, a metaloxy moiety M-O—, or $CH_2$—W, where W is a heteroatom, the free valencies of which have been satisfied by hydrocarbon moieties, U is an $-OR^6$ group, or an $-NR^{6a}R^{6b}$ group, $R^6$, $R^{6a}$, and $R^{6b}$ are hydrogen, or an unsubstituted or substituted aliphatic, olefinic, or aromatic hydrocarbon moiety having from 1 to 12 carbon atoms, $R^{10}$, $R^{11}$, $R^{12}$ and $R^{13}$ are hydrogen, a halogen, or a moiety bonded by way of a carbon atom, where the moieties $R^{10}$, $R^{11}$, $R^{12}$ and $R^{13}$ can have bonding to one another, with the proviso that at most two of moieties $R^{10}$, $R^{11}$, $R^{12}$ and $R^{13}$ are hydrogen, and M is a metal atom which can have free valencies which have been saturated by ligands, where polymer blends (A) which form $SiO_2$ during the crosslinking process are excluded.

2. The process as claimed in claim 1, wherein the moieties $R^1$, $R^2$, and $R^3$ are methyl, ethyl, propyl, vinyl, or phenyl moieties, or carboxy moieties $-C(O)OR^6$.

3. The process as claimed in claim 1, wherein the compounds (V) are low-molecular-weight compounds (N) in a form of silanes of the general formula [10]

$$R^{5a}{}_{4-n}Si(O-C(R^1)(R^2)(R^3))_n \quad [10]$$

or of their hydrolysis and condensation products, where n has the value 1, 2, or 3, and the definitions of $R^{5a}$ are the same as those of $R^5$.

4. The process as claimed in claim 1, wherein the polymer blends (A) comprise polymers (P) which are linear, branched, or cyclic organopolysiloxanes of the general formula [72]

$$(R^7{}_3SiO_{1/2})_a(R^7{}_2SiO_{2/2})_b(R^7SiO_{3/2})_c(SiO_{4/2})_d \quad [72],$$

where
- $R^7$ is defined in accordance with the definition of $R^5$, and at least one moiety $R^7$ assumes the definition —O—C($R^1$)($R^2$)($R^3$), and
- a, b, c, and d are an integral value greater than or equal to 0, with the proviso that the sum a+b+c is at least 1.

5. The process as claimed in claim 1, wherein the catalysts (K) are selected from the group consisting of titanium compounds, zirconium compounds, cerium compounds, carboxylic acids, sulfonic acids, hydrochloric acid, nitric acid, phosphoric acid, and triphenylsulfonium trifluoromethanesulfonate.

6. The process as claimed in claim 1, wherein the polymer blends (A) are heated to a temperature of from 20° C. to 250° C.

7. The process as claimed in claim 1, wherein foam layers, foamed moldings, adhesive masses, or sealants are produced.

8. A silicone-based foam obtainable from the polymer blends (A) by the process as claimed in claim 1.

* * * * *